United States Patent
Tan et al.

(10) Patent No.: US 6,613,403 B2
(45) Date of Patent: *Sep. 2, 2003

(54) INK WITH NEAR INFRARED FLUOROPHORES AND U.V. ABSORBERS

(75) Inventors: Yaoping Tan, Miamisburg, OH (US); Maurice W. Lewis, Dayton, OH (US); David M. Dashiell, Miamisburg, OH (US)

(73) Assignee: NCR Corporation, Dayton, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 31 days.

(21) Appl. No.: 09/277,527

(22) Filed: Mar. 26, 1999

(65) Prior Publication Data

US 2003/0108689 A1 Jun. 12, 2003

Related U.S. Application Data

(63) Continuation-in-part of application No. 09/218,290, filed on Dec. 21, 1998, now abandoned.

(51) Int. Cl.$^7$ ................................................. B41M 5/00
(52) U.S. Cl. ..................... 428/29; 106/31.13; 427/256; 427/258; 428/195; 428/201; 428/204; 428/913; 503/200; 503/226
(58) Field of Search ....................... 106/31.13; 427/256, 427/258; 428/29, 195, 201, 203, 204, 913; 503/200, 226

(56) References Cited

U.S. PATENT DOCUMENTS

| | | | |
|---|---|---|---|
| 4,452,843 A | 6/1984 | Kaule et al. | 428/199 |
| 4,598,205 A | 7/1986 | Kaule et al. | 250/458.1 |
| 5,292,855 A | 3/1994 | Krutak et al. | 528/289 |
| 5,336,714 A | 8/1994 | Krutak et al. | 524/608 |
| 5,397,819 A | 3/1995 | Krutak et al. | 524/88 |
| 5,423,432 A | 6/1995 | Krutak et al. | 209/577 |
| 5,461,136 A | 10/1995 | Krutak et al. | 528/289 |
| 5,503,904 A | 4/1996 | Yoshinaga et al. | 428/195 |
| 5,558,020 A | 9/1996 | Marozzi et al. | 101/228 |
| 5,614,008 A | 3/1997 | Escano et al. | 106/23 D |
| 5,665,151 A | 9/1997 | Escano et al. | 106/31.15 |
| 5,703,229 A | 12/1997 | Krutak et al. | 540/140 |
| 6,106,910 A * | 8/2000 | Tan et al. | 428/29 |

FOREIGN PATENT DOCUMENTS

| | | | |
|---|---|---|---|
| EP | 0 816 116 | * | 1/1998 |
| EP | 0 933 228 | * | 8/1999 |
| WO | 97/32733 | | 9/1997 |

* cited by examiner

Primary Examiner—Bruce H. Hess
(74) Attorney, Agent, or Firm—Millen, White, Zelano & Branigan, P.C.

(57) ABSTRACT

Printing inks and printing systems which contain near infrared fluorescent compounds and U.V. absorbing pigments provide print media with coatings, sense marks and data images containing NIRF compounds and U.V absorbing pigments with improved light stability. These printing inks and printing systems can be modified for use in a wide variety of printing methods. The print media obtained contains detectable NIRF compounds after the equivalent of 6 months exposure to indoor U.V. light.

24 Claims, No Drawings

INK WITH NEAR INFRARED FLUOROPHORES AND U.V. ABSORBERS

This application is a continuation-in-part of application Ser. No. 09/218,290 filed on Dec. 21, 1998, now abandoned, which is hereby incorporated by reference.

FIELD OF THE INVENTION

The present invention relates to inks with near infrared fluorescent (NIRF) compounds which provide coatings and markings invisible to the human eye that can be used as security features to thwart counterfeiting. More particularly, the invention relates to inks which provide coatings, markings and images containing NIRF compounds with improved light stability to extend their useful life.

BACKGROUND OF THE INVENTION

The use of near infrared fluorescent (NIRF) compounds in inks is well known. Representative disclosures in this field are as follows:

U.S. Pat. No. 5,292,855 (Mar. 8, 1994), U.S. Pat. No. 5,423,432 (Jun. 13, 1995) and U.S. Pat. No. 5,336,714 (Aug. 9, 1994), all issued to Krutak et al., describe polyester-based and polyester-amide based coatings and ink compositions with near infrared fluorescent (NIRF) compounds which are used for marking articles for identification/authentication purposes.

U.S. Pat. No. 5,461,136 (Oct. 24, 1995), U.S. Pat. No. 5,397,819 (Mar. 14, 1995), and U.S. Pat. No. 5,703,229 (Dec. 30, 1997), also issued to Krutak et al., also disclose tagging thermoplastic containers and materials with near infrared fluorescent compounds.

International application WO 97/32733, published Sep. 12, 1997, discloses the use of near infrared fluorescent compounds as a security ink in thermal transfer printing wherein an image is formed by thermally transferring ink from a ribbon to paper.

U.S. Pat. Nos. 5,614,008 and 5,665,151, issued to Escano et al., disclose inks containing NIRF compounds.

Kaule et al., U.S. Pat. Nos. 4,452,843 and 4,598,205, disclose rare earth metal luminophores which absorb in the visible region and optionally the near-infrared region and can be excited in substantial portions of the visible or near IR-region.

Yoshinaga et al., U.S. Pat. No. 5,503,904, disclose recorded media with an invisible identification mark composed of regions of high reflectance and low reflectance in the same near infrared region.

NIRF (Near Infrared Fluorescence) compounds are desirable for use in security printing and invisible identification applications because they are not easily identified by human vision under the black light, broad spectrum light and infrared light. The images or marks of NIRFs are virtually free from interference deriving from background near infrared fluorescence or absorption because such materials are very rarely encountered in paper or other print receiving materials. However, like most dyes, the NIRF compounds intrinsically have very poor light stability and this greatly limits the applications of NIRF technology.

By nature, NIRF compounds are vulnerable to oxidation in the presence of oxygen, and gradually lose their near infrared fluorescence properties. The oxidation process is greatly accelerated when the NIRF compounds are exposed to U.V. light. This makes the NIRF inks and coatings unsuitable for use even in the normal office lighting conditions with practical amount of inks or coating applied.

Based on the mechanism of oxidation, there are two key elements in this process; one is oxygen and the other is U.V. light. If both or either one of them could be blocked or inhibited, the useful life of NIRF compounds would be remarkably improved. Based on this theory, Eastman Chemical Company captured the NIRF dyes with glassy type of polymers to shield NIRF dyes from oxygen, and then grind them to small particles for use. This approach does improve the light stability of NIRFs from days up to two months in the normal office lighting conditions.

SUMMARY OF THE INVENTION

It is a general object of the present invention to prolong the useful life of NIRF compounds used in print media to provide security features, sense marks and data images which are invisible to the human eye.

A specific object of the present invention to provide a printing ink comprising a NIRF compound and a U.V. absorbing pigment or compound which does not interfere with the emission of radiation at wavelengths in the range of from 650 nm to 2,500 nm by the NIRF compound.

Another specific object of the present invention to provide a printing ink comprising a NIRF compound and a U.V. absorbing pigment such as titanium dioxide, and zinc oxide.

An additional object of the present invention to provide a printing system comprising a printing ink containing a NIRF compound and a coating formulation containing U.V. absorbing pigment such as titanium dioxide and zinc oxide.

A further object of the present invention to provide a substrate such as a print medium with a near infrared radiation scannable coating, sense mark or data image positioned thereon that either contains a U.V. absorbing pigment or compound or is over coated with a layer which comprises a U.V. absorbing pigment or compound.

Yet a further object of the present invention to provide a thermal paper with a near infrared radiation scannable coating, sense mark or data image positioned thereon that either contains a U.V. absorbing pigment or is over coated with a layer which comprises a U.V. absorbing pigment.

Yet a further object of the present invention to provide a thermal transfer ribbon capable of applying a near infrared radiation scannable coating, sense mark, or data image onto a suitable receiving medium that either contains a U.V. absorbing pigment or contains a U.V. absorbing pigment in a protective second layer.

Still yet another object of the present invention to provide printing methods for preparing printed images with a near infrared fluorescent (NIRF) scannable coating, sense mark or data image that is protected by a U.V. absorbing compound or pigment.

The above objects are achieved through the printing inks, printing systems, print media and printing methods of this invention.

The printing inks comprise at least one resinous binder, at least one near infrared fluorescent (NIRF) compound which fluoresces photons at wavelengths in the range of 650 nm to 2500 nm and optionally a solvent or aqueuous based solvent. The amount of NIRF compound in the ink is sufficient to form coatings, marks and images which can be sensed by a photon detector operating in the near infrared region of 650 nm to 2500 nm. The printing inks further comprise a U.V. absorbing pigment or compound which does not attenuate the emission of radiation at wavelengths in the range of from 650 nm to 2,500 nm by the coatings, marks and images formed containing the NIRF compound.

Preferably, the U.V. absorber is a pigment selected from the group consisting of titanium dioxide, zinc oxide and combinations thereof and is preferably present in an amount sufficient to form coatings, marks and images containing NIRF compounds with enhanced light-fastness. In preferred embodiments, the NIRF compound is shielded from ambient air so as not to react with the oxygen therein.

In another aspect of the present invention, there is provided a printing system which comprises a printing ink and a coating composition. The printing ink comprises at least one solvent or aqueous based solvent, at least one resinous binder and at least one near infrared fluorescent (NIRF) compound as described above in an amount as prescribed above. The coating formulation comprises a U.V. absorbing pigment selected from the group consisting of titanium dioxide, zinc oxide and combinations thereof in an amount sufficient to form an overcoat on coatings, marks and images containing NIRF compounds which enhances the light-fastness of said NIRF compounds.

In a further aspect of this invention, there is provided a substrate, preferably a print medium such as thermal paper, with at least one near infrared radiation scannable coating, sense mark or data image positioned thereon. The near infrared radiation scannable coating, sense mark or data image comprises at least one near infrared-fluorescent (NIRF) compound as described above and a polymer binder resin which limits contact of the NIRF compound with air. The near infrared radiation scannable coating, sense mark or data image either: a) additionally comprises a U.V. absorbing pigment or compound, b) is overcoated with a layer which comprises a U.V. absorbing pigment or compound, or c) both contains a U.V. absorbing pigment or compound and is overcoated with a layer which does. Preferably a U.V. absorbing pigment selected from the group consisting of titanium dioxide, zinc oxide and combinations thereof is used in the overcoating and the scannable coating, sense mark or data image.

In yet a further aspect of this invention, there are provided printing methods for preparing printed images with a near infrared fluorescent (NIRF) scannable coating, sense mark or data image, wherein an ink is applied to a substrate by conventional techniques. The improvement comprises printing with a printing ink or a printing system as described above. Where the printing system is used, the coating, sense mark or data image formed from the printing ink is overcoated with a layer of the coating formulation.

In a further aspect of this invention, there is provided a carrier, such as a thermal transfer ribbon, with at least one near infrared radiation scannable compound used to make scannable coatings, sense marks, or data images which comprises at least one near infrared fluorescent (NIRF) compound as described above and a polymer binder resin which limits contact of the NIRF compound with air. The near infrared radiation scannable coating, sense mark, or data image either: a) additionally comprises a U.V. absorbing pigment in the primary layer or b) is overcoated with a secondary layer which comprises a U.V. absorbing pigment or compound, or c) both layers contain a U.V. absorbing pigment or compound. Preferably, a U.V. absorbing pigment selected from the group consisting of titanium dioxide, zinc oxide and combinations thereof is used in the layers.

The printing inks of this invention can be applied to any conventional base sheet, such as paper, suitable for use in conventional printing methods using conventional equipment. The printing inks can vary in composition, as is conventionally known in the art, including the incorporation of waxes and other optional components.

The NIRF compounds employed in the printing inks, print media and methods of the present invention provide coatings, marks and images that are responsive to wavelengths in the near infrared region of 650 nm to 2500 nm. The NIRF compounds emit radiation (fluoresce photons) at wavelengths in the range of 650 nm to 2500 nm and are present in amounts such that the coatings, marks and images which contain them can be sensed by a photon detector operating at wavelengths in the range of 650 nm to 2500 nm. The NIRF compounds need not absorb or transmit visible light under ambient indoor conditions or when illuminated. Preferably, they are transparent or invisible to the naked human eye under ambient light.

Preferred NIRF compounds are used in the form of dyes or pigments, have excellent thermal stability and impart little or no color to the coatings and substrates to which they are applied. These compounds have strong absorption of near infra-red light high molar extinction coefficients (e.g., >2000), and have strong fluorescence in the near infrared over the wavelengths of about 670 nm to 2500 nm. They are preferably show some stability to sunlight and fluorescent light.

Suitable NIRF compounds include those described in U.S. Pat. Nos. 5,292,855; 5,423,432; 5,336,714; 5,461,136; 5,397,819; 5,703,229; 5,614,088; 5,665,151 and 5,503,904, which typically are in the form of pigments or dyes. The NIRF dyes comprise NIRF compounds in solution, preferably in an aqueous solution. The NIRF pigments are solids and comprise a polymer or copolymer which is either admixed with NIRF compounds or the NIRF compounds are copolymerized with other active monomers, oligomers or polymers to form a copolymer, which is then added to a coating formulation. The use of a NIRF compound as a pigment or dye may depend on the printing equipment used as well as the end product.

Preferred NIRF compounds are selected from the classes of phthalocyanines, naphthalocyanines, squaraines that correspond to formulae II, III and IV in column 6 of U.S. Pat. No. 5,703,229. These compounds can be prepared by conventional methods.

Preferred compounds of Formulae II and III include those which have phthalocyanine (Pc) moieties and 2,3-naphthalocyanine (Nc) moieties of formulae ILIA and IIIa defined in column 7 of U.S. Pat. No. 5,703,229 and substituents as defined in column 7, line 45 to column 9, line 14 of U.S. Pat. No. 5,703,229. Additional preferred NIRF compounds of formulae II and III include those defined in column 9, lines 15–34, of U.S. Pat. No. 5,703,229 and the phthalocyanine and 2,3-naphthalocyanine compounds of formula ILIA and IIIa covalently bound to a hydrogen, AlOH, Ca, CO, CrF, Cu, Fe, Ge, Ge(OR$_6$), InCl, Ni, Ga, Mg, Mn, Pb, Pt, Pd, SnCl$_2$, Sn, Si(OR)$_2$, Sn(OR$_6$)$_2$, TiO, VO, Zn and others, as described in U.S. Ser. No. 789,570, filed Nov. 8, 1991, which is a grandparent application of U.S. Pat. No. 5,461,136. Other preferred compounds are described in examples 1–41 of U.S. Pat. No. 5,461,136.

For this invention, the terms "alkyl", "lower alkyr", "lower alkoxy", "lower alkylthio", "lower alkoxy carbonyl", "lower alkanoyl" and "lower alkanoyloxy", where used in U.S. Pat. No. 5,703,229 and herein; refer to an "alkyl" portion that represents 1–6 carbon atoms, which can be substituted by hydroxy, halogen, carboxy, cyano, alkoxy and aryl. "Cycloalkyl" represents 3–8 cyclic carbon atoms; "aryl" represents 6–18 aromatic carbon atoms; "heteroaryl" represents 2–17 cyclic carbon atoms with at least one oxygen, sulphur, nitrogen or a combination thereof, "alkenyl" and "alknyl" represent 3–8 carbon atoms with at least one double bond; "halogen" represents Br, Cl, F or I; "substituted carbamoyl" and "substituted sulfamoyl" represent $CONR_{12}R_{13}$ and $—SO_2NR_{12}R_{13}$, respectively, where $R_{12}$ and $R_{13}$ represent alkyl, alkenyl, alkynyl, cycloalkyl, aryl and heteroaryl, and "acyl" represents $R_{15}C(O)—O—$, wherein $R_{15}$ is alkyl.

The concentration of the NIRF compound within the printing inks and print media (coatings, marks and images) of this invention can vary over wide limits. In general, an optical effect can be developed from printing inks with a NIRF compound as a dye or pigment component present in an amount as low as 0.1 ppm based on the total weight of solids (dry components). Amounts within the range of 0.5 ppm to 1000 ppm, based on the dry components of the printing ink, coating, mark or data image, are easily detected. It is generally desirable that the NIRF compound be present at the lowest practical level needed to produce a printing ink, coating, mark or data image with a satisfactory fluorescence detection level to avoid interference from other colors and to minimize costs. It may also be desirable to add higher levels to coatings, marks and data images to extend the useful life of these coatings, marks and data images.

Apparatus used to detect the presence of NIRF compounds include any apparatus capable of detecting fluorescence, i.e., photons emitted by dyes and pigments at wavelengths in the range of about 670 nm to 2,500 nm. These photon detectors include photomultiplier tubes, solid state detectors, semiconductor based detectors and similar devices. Silicon photodiodes or germanium detectors are specific examples of suitable photon detectors. Filters may be used to restrict the wavelengths which impinge the detector.

Devices which irradiate the NIRF compounds with near infra-red radiation include laser diodes, solid state lasers, dye lasers, incandescent lights sources and other light sources which emit radiation at a wavelength in the range of 670–2500 nm. Preferred light sources are those which have a maximum signal at the maximum of the absorbence of the NIRF compound. Filters may be used to restrict the wavelengths which irradiate the NIRF compounds.

Preferably, the NIRF compound is shielded from ambient air to prevent reaction with oxygen. The NIRF compound can be shielded by applying a protective coating on the layers formed with such compounds, incorporating the compound in protective particle, or both. Where NIRF dyes are used to form a coating, mark or data image, it is overcoated with a polymer resin layer for protection. The NIRF pigments are solid particles that comprise a polymer or copolymer which is either admixed with NIRF compounds or the NIRF compounds are copolymerized with other active monomers, oligomers or polymers to form a copolymer. The polymer resin components in the NIRF pigments serve to shield the NIRF compounds therein.

The active monomers, oligomers or polymers which form the pigments typically have at least one reactive group selected from the formulae

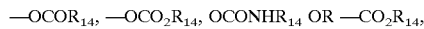

$—OCOR_{14}, —OCO_2R_{14}, OCONHR_{14}$ OR $—CO_2R_{14}$, wherein $R_{14}$ is selected from unsubstituted or substituted alkyl, cycloalkyl or aryl radicals, $R_{14}$ preferably is unsubstituted alkyl, e.g., alkyl of up to about 8 carbons, or phenyl, and most preferably lower alkyl, e.g., methyl and ethyl. The reactive group preferably is hydroxy, carboxy, carbomethoxy, carboethoxy or acetoxy. The monomers and oligomers contain 1 to about 8 reactive groups, preferably 2. The polymers may contain more. The NIRF compounds are added at such low levels that they do not significantly interfere with the polycondensation reaction of these active species.

The polymers admixed with NIRF pigments or copolymerized therewith are preferably polyesters, polycarbonates and polyurethanes and are used in an amount sufficient to render the NIRF pigments waterproof.

The diol components of the polyester used may be comprised of, for example, ethylene glycol, 1,4-cyclohexanedimethanol, 1,2-propanediol, 1,3-propanediol, 2-methyl-, 1,3-propanediol, 1,6-hexanediol, 1,2-cyclohexanediol, 1,4-cyclohexanediol, 1,10-decanediol, 1,2-cyclohexanedimethanol, 1,3-cyclohexanedimethanol, X,8-bis-(hydroxymethyl)-tricyclo-[5.2.1.0]-decane wherein X represents 3, 4, or 5; and diols containing one or more oxygen atoms in the chain, e.g., diethylene glycol, triethylene glycol, dipropylene glycol or tripropylene glycol and the like. In general, these diols contain 2 to 18, preferably 2 to 12 carbon atoms. Cycloaliphatic diols can be employed in their cis or trans configuration or as a mixture of both forms.

The acid components (aliphatic, alicyclic, or aromatic dicarboxylic acids) of the polyester used may be comprised of, e.g., terephthalic acid, naphthalene-2,6-dicarboxylic acid, isophthalic acid, 1,4-cyclohexanedicarboxylic acid, 1,3-cyclohexane dicarboxylic acid, succinic acid, glutaric acid, adipic acid, sebacic acid, 1,12-dodecanedioic acid and the like. In place of the dicarboxylic acids themselves, it is possible and often preferable to use a functional acid derivative thereof such as the dimethyl, diethyl or dipropyl ester of the dicarboxylic acid. The anhydrides of the dicarboxylic acids can likewise be employed. The polyesters can be produced using typical polycondensation techniques well known in the art. Polycarbonates useful in the practice of the invention are disclosed in *Kirk-Othmer Encyclopedia of Chemical Technology*, third edition, Vol. 18, pp. 479–494.

A NIRF pigment concentrate may be formed which comprises a NIRF compound of formula II, III or IV as discussed above, polymerized in a partially crystalline polyester at a level of from 0.1 to 30.0 wt. %, preferably 0.1 to about 10.0 wt. %. These copolymers preferably have at least two reactive groups. This concentrate can be used as a powder or pellet admixed with a desired polyester or other thermoplastic polymer. The concentrate may be dry blended or solution blended with additional resin. Suitable polyesters are linear thermoplastic crystalline or amorphous polymers.

A wide range of thermoplastic polymers suitable for blending with the above NIRF pigment concentrate are known in the art and include polyesters, e.g., poly(ethylene terephthalate) and poly(butylene terephthalate); polyolefins, e.g., polypropylene, polyethylene, linear low density polyethylene, polybutylene and copolymers made from ethylene, propylene and/or butylene; polyamides, e.g., nylon 6 and nylon 66; polyvinyl chloride, polyvinylidene chloride; polycarbonates; cellulose esters, e.g., cellulose acetate, propionate, butyrate or mixed esters; polyacrylates, e.g., poly(methyl methacrylate); polyimides; polyester-amides; polystyrene; and ABS (acrylonitrile-butadiene-styrene)type polymers.

The NIRF pigments may contain additional additive or binder components to enhance or add to their performance, such as the U.V. absorbing pigment or compound.

The U.V. absorbing pigments and compounds suitable for use in the printing inks and print media of this invention are those which do not reduce the emission of radiation at wavelengths in the range of from 650 nm to 2,500 nm by the NIRF compounds within the coatings, mark and images formed by the printing inks and on the print media of this invention. The U.V. absorbing pigments are preferred and of the U.V. absorbing pigments, those which are preferred are selected from the group consisting of titanium dioxide, zinc oxide and combinations thereof. Titanium dioxide has white color, superior opacity and hiding power, due to its extraordinarily high refractive index, and blocks out most U.V. light. Titanium dioxide is ideally suited to print on white substrates, such as paper stocks. Zinc oxide is much less opaque, has good weather resistance, U.V. absorption and heat resistance. Zinc oxide is well suited for applications where transparency is desired. In addition, zinc oxide does not cause thermal dyes within thermal paper to activate prematurely so that it can be incorporated in or applied on top of the thermosensitive coating/layer of thermal papers.

The amount of U.V. absorbing pigment or compound used in the printing inks and the coatings, marks and data images on print media containing NIRF compounds is preferably sufficient to enhance light-fastness (light stability)of the coatings, marks and data images. With a U.V. absorbing pigment, an amount sufficient to improve the light-fastness of the coatings, marks and data images containing NIRF compounds by more than 300% is preferred. This can be accomplished with amounts of titanium dioxide, zinc oxide or a combination thereof within the range of 5–50 wt %, based on the total weight of dry components in the printing ink or the coatings, marks and data images containing NIRF compounds. For titanium dioxide, amounts of 5–20 wt % provide significant improvements in lightfastness. Coatings, marks and images containing NIRF compounds and these levels of titanium dioxide are often sufficiently stable to indoor U.V. light such that the NIRF compounds can be sensed by a detector over 6 months after they are applied to a substrate.

The resinous binder employed will depend on the method of applying the printing ink, i.e., either ink jet, flexographic, electrostatic or thermal transfer printing. Conventional resinous binders for these printing methods can be employed in the printing inks of this invention. The resinous binders may comprise a blend of resins to provide a specific property profile. The amount of resinous binder employed will also depend on the printing method in which the printing ink is used.

For flexographic printing, it is preferable that the resinous binder used be water soluble, dispersible or emulsifiable. Conventional binders for flexographic inks are commonly selected from rosin esters, and other synthetic film-forming polymers such as polyamides, alkyd resins and proteins (kasien, gels and select protein). The choice of binder will depend on the substrate employed. Water soluble, dispersible or emulsifiable resins suitable as binders include thermoplastic resins such as acrylic resins, (methacrylic resin, methacrylic copolymers, modified methacrylic copolymers), polyvinyl chloride, polyvinyl acetate, vinyl chloride-vinyl acetate copolymers, polyethylene, polypropylene, polyacetal, ethylene-vinyl acetate copolymer, ethylenealkyl (meth)acrylate copolymer, ethylene-ethylacetate copolymer, polystyrene, styrene copolymers, polyamide, ethylcellulose, epoxy resin, polyketone resin, polyurethane resin, polyvinylbutryl, styrenebutadiene rubber, nitrile rubber, acrylic rubber, ethylene-propylene rubber, ethylene alkyl (meth)acrylate copolymer, styrene-alkyl(meth)acrylate copolymer, acrylic acid-ethylene-vinylacetate terpolymer, saturated polyesters and sucrose benzoate.

For flexographic printing, the amount of thermoplastic resin can range from 15–35 wt. %, and preferably comprises at least 25 wt. % of the coating formulation, based on the total dry ingredients. To obtain emulsions of polymers which are insoluble or partially soluble in water at these levels, the resin is typically ground to submicron size.

A conventional solvent or aqueous based solvent for printing inks can optionally be added to the ink, depending on the printing method to be employed. The printing inks preferably comprise an aqueous based solvent comprising at least 20 wt. % water. The aqueous based solvent can comprise water with or without a water soluble or emulsifiable organic solvent. Those commonly employed are lower aliphatic alcohols, including propanol, isopropanol, ethanol, butanol, lower aliphatic esters, in particular, ethyl acetate and lower aliphatic ketones, in particular, methylethyl ketone. Additional solvent systems for printing inks such as flexographic inks are described in *Kirk-Othmer Encyclopedia of Technology*, $3^{rd}$ Edition, Volume 13, John-Wiley & Sons (New York: 1981). The aqueous based solvent may contain a dispersing agent to help solubilize the NIRF pigment or dye. It is essential that any resin binder used with these solvents be soluble, dispersible or emulsifiable in water to provide a water-based ink. The resin binders and the amount thereof can vary widely. For example, the amount of resin binder used can vary from 5 to 70 wt. % based on the total weight of the printing ink.

In preparing the printing ink, a polymer resin binder, a NIRF compound (pigment or dye), U.V. absorbing pigment or compound and optional solvent are combined. When preparing flexographic inks, the components can be combined as dispersions at about 30 wt. % solids in a ball mill or similar conventional grinding equipment and agitated and ground. The solvent and binder can be used at conventional levels in that the amount of NIRF compounds are so low as to not disturb the function of these conventional components. Optionally, pH stabilizers, surfactants, defoamers and additional solvents can be added. When preparing the printing ink for thermal transfer printing, a formulation of the ink components is applied to a substrate either by a hot melt technique or in a solution, which is dried.

The NIRF printing ink can have a solids content which ranges widely such as from 10 to 100 wt. % which includes the NIRF compound and resinous binder components. The amount of carrier (solvent or aqueous based solvent) can range vary from 0 to 70% based on the weight of the printing ink. The solids content will depend on the printing method in which the printing ink is used. For example, a solids content of from 40–60 wt. % is preferred for conventional flexographic printers such as those provided by Wolverine and Mark Andy. Inks for jet printing have a lower solids content while the ink layer for thermal transfer ribbons are often 100% solids.

The printing inks, particularly those used in thermal transfer ribbons, may comprise a water emulsifiable or dispersible wax and/or a water soluble, emulsifiable or dispersible thermoplastic resin binder component. The waxes can be natural waxes, including Carnauba wax, candelilla wax, beeswax and rice bran wax, petroleum waxes such as paraffin wax, synthetic hydro-carbon waxes such as low molecular weight polyethylene wax, polypropylene wax, polytetrafluoroethylene wax and Fisher-Tropsch wax, higher fatty acids such as myristic acid, palmitic acid, stearic acid and behenic acid; higher aliphatic alcohols such as steryl alcohol and esters such as sucrose fatty acid esters. Mixtures of waxes can also be used. To aid in the dispersion of the wax within an aqueous medium, micronized grades of wax are preferred.

Suitable additives for the printing ink include defoamers, UV absorbents, thickening agents, softening or coalescing agents. Suitable defoaming agents are those of the silicone fluids and silicone emulsions. Softening or coalescing agents comprise glycols and their derivatives. Thickening agents preferably comprise aqueous dispersions of highly polymeric acrylic polymers and cellulose derivatives. These additives also must not interfere with the NIRF fluorescence.

Optionally, conventional colorants may be added to the printing ink which do not reduce the emission of radiation at wavelengths in the range of from 650 nm to 2,500 nm by the NIRF compounds within the coatings, marks and images formed by the printing ink. These colorants can be organic or inorganic dyes or pigments and are preferably organic dyes. Suitable colorants fall within the full spectrum of colors Pigments other than carbon blacks can be used at high levels where they do not interfere with the detection of NIRF compounds and are typically white pigments. The colorants employed can include a combination of dyes and pigments, but they contain less than 3 wt. % carbon black. Carbon black absorbs near infrared radiation such that detection of NIRF compounds within a carbon black based ink is unreliable. Preferably, the colorant is free of carbon black, and, where a black image is desired, it is necessary to combine organic dyes to achieve such coloration. Colorants which provide cyan, magenta, yellow and black coloration can be used in combination to generate essentially any color.

The water-soluble dyes can include basic dyes, acid dyes or salts thereof Suitable basic dyes for use in the flexographic inks of the invention, include basic yellow: 2, 13, 28, 37 and 65; basic orange: 2, 2 and 5; basic red 1, 2, 14 and 28: basic violet 1, 2, 3 and 10; basic blue: 1, 3, 5, 7, 8, 9, 11, 26, 55 and 81; basic green: 1 and 4; and basic brown: 1. Suitable acid dyes for use in flexographic inks according to the invention include acid yellow: 3, 5, 17, 23, 36, 34, 73, 121, 157, 194, 204 and 236; acid orange: 3, 7, 10, 142 and 144; acid red: 18, 52, 87, 88, 143, 221, 289, 357 and 359; acid green: 1, 16, 26 and 104; acid blue: 1, 7, 9, 15, 20, 22, 93, 129, 193, 254 and 285; acid brown: 101, 103, 165, 266, 268, 355, 357, 365 and 384; and acid black: 47, 52 and 94. These dyes are all classified in the color index, *Color Index,* 3$^{rd}$ Edition, The American Color Association of Textile Chemists and Colorists, P.O. Box 12215, Research Triangle Park, N.C. 27709, and are well known to those skilled in the art.

The thermal transfer ribbons of this invention comprise a substrate and a thermal transfer layer positioned thereon which comprises an ink that contains at least one resinous binder, at least one near infrared fluorescent (NIRF) compound as described above, in an amount sufficient to form coatings, marks and images which can be sensed by a photon detector operating in the near infrared region of 650 nm to 2,500 nm, and a U.V. absorbing pigment or compound which does not reduce the emission of radiation at wavelengths in the range of from 650 nm to 2,500 nm by the coatings, marks and images formed by the thermal transfer layer containing the NIRF compound.

The thermal transfer ribbons of the present invention also include embodiments wherein a) the thermal transfer layer does not comprise a U.V. absorbing pigment or compound but is instead overcoated with a secondary layer which does contain at least one U.V. absorbing pigment or compound and b) both the thermal transfer layer and secondary layer contain at least one U.V. absorbing pigment or compound.

In preferred embodiments, the thermal transfer layer and secondary layer contains a U.V. absorbing pigment selected from the group consisting of titanium dioxide, zinc oxide and combinations thereof in an amount sufficient to form coatings, marks and images containing NIRF compounds with enhanced light-fastness.

The printing system of this invention comprises a printing ink and a coating formulation. The printing ink comprises an optional solvent or aqueous based solvent, at least one resinous binder and at least one near infrared fluorescent (NIRF) compound which emits radiation at wavelengths in the range of 650 nm to 2,500 nm as in the printing inks of this invention described above. The amount of NIRF compound in this ink is sufficient to form coatings, marks and images which can be sensed by a photon detector operating in the near infrared region of 650 nm to 2,500 nm, which is also consistent with the printing inks of this invention. However the printing inks of the printing systems provided by this invention do not contain a U.V. absorbing pigment or compound. A U.V. absorbing pigment selected from the group consisting of titanium dioxide, zinc oxide and combinations thereof is incorporated in the coating formulation of the printing system. The amount of U.V. absorbing pigment is sufficient to form an overcoat which enhances the light-fastness of coatings, marks and images containing NIRF compounds prepared by the printing ink of the printing system. Amounts sufficient to improve the light-fastness of the coatings, marks and data images containing NIRF compounds by more than 300% is preferred. This can be accomplished with amounts of titanium dioxide, zinc oxide or a combination thereof within the range of 5–50 wt %, based on the total weight of dry components in the coating formulation. Amounts of 5–20 wt % titanium dioxide in the overcoating provide significant improvements in lightfastness of coatings, marks and images containing NIRF compounds such that the NIRF compounds therein can be sensed by a detector over 6 months after they are applied to a substrate. The coating formulation may additionally contain a NIRF compound where desired. The printing ink and coating formulation of the printing system may, independently, also contain a colorant as described above.

The inks of this invention can be used to print an invisible code of encrypted data describing securities features or a proprietary code used on a check. A reader would be designed to read this encrypted data and validate this information against a customer record. A display would then indicate the results of the security scan. If the check printed with the security feature shows that the validation failed, then this would represent a fraudulent check. Such a security feature and detector could be incorporated in conventional desktop check readers used by bank tellers and grocery store cashiers or could be incorporated in a medium/high speed bank sorter-reader.

In preferred embodiments, the security feature and sensor electronics would be placed inline with the MICR code line reader and the OCR reader and would also serve as the decoder. The security mark would be invisible to the human eye and therefore would not interfere with the readability of the MICR codeline and the OCR. In addition, it is less likely that a teller would write information in the code line area, and therefore the chances of the security feature being destroyed are greatly reduced. The printing ink of this invention would provide a codeable data string for validated standard security features. Each security feature could be allocated a unique code. When read by a reader, the security feature would be reconciled against a database containing customer-by-customer descriptions of their security documents and their specific security features. Additional data may also be added which identifies the origin of the document. Such an indicator would provide positive proof of the validity of the checks.

The print media of this invention can be prepared from the printing inks and printing systems described above by applying these printing inks/printing systems to the medium such as paper stock. The print media of this invention have at least one near infrared radiation scannable coating, sense mark or data image positioned thereon. The near infrared radiation scannable coating, sense mark or data image comprises at least one near infrared-fluorescent (NIRF) compound as described above. This NIRF compound emits near infrared radiation at a wavelength in the range of from 650 nm to 2,500 nm. The near infrared radiation scannable coating, sense mark or data image also comprises at least one polymer binder resin which limits contact of the NIRF compound with air. Suitable polymer binder resins are those described above which form NIRF pigment particles by admixture or copolymerization. The near infrared radiation scannable coating, sense mark or data image either a) additionally comprises a U.V. absorbing pigment or compound as described above b) is overcoated with a layer which comprises a U.V. absorbing pigment or compound consistent with the coating formulations described above, or c) both contains a U.V. absorbing pigment or compound and is overcoated with a layer which contains a U.V. absorbing pigment or compound.

The use of U.V. absorbing pigments selected from the group consisting of titanium dioxide, zinc oxide and combinations thereof is preferred as discussed above and where the near infrared radiation scannable coating, sense mark or data image comprises a scannable layer positioned on said print medium, the concentration of titanium dioxide or zinc oxide in the scannable layer or overcoated layer preferably ranges from 5 to 50 wt %, based on total solids within said scannable layer or overcoat layer. Preferred embodiments are sufficiently stable such that the NIRF compounds therein can still be sensed by a detector after six months exposure to ambient indoor light The near infrared radiation scannable coatings on the print media of this invention comprise coatings which cover the entire surface of a print medium. These coatings contain low concentrations of NIRF and are well suited to serve as a security feature in identifying authentic documents.

The near infrared radiation scannable sense marks on the print media of this invention comprise marks, preferably positioned on the surface of the print medium, which contrast the background surface of said print medium in emitting near infrared radiation such that the mark can be sensed by a detector operating in the near infrared region. The contrast between the mark and base sheet must be sufficiently high such that the location of the mark on the base substrate can be identified by a logic element (circuit or apparatus) operating on a signal from the detector. Preferably, the detected near infrared radiation is converted to a voltage by the detector, such as a photon detector, and the mark provides a voltage of at least 0.1 volts greater than the surface of the print medium. Preferably, the voltage differential is about 0.2 volts. The marks are positioned so as to trigger an automated operation when identified by the logic element. Preferably, the print medium comprises multiple sense marks spaced at regular intervals. The marks have an area sufficient for a detector operating in the near infrared region of 650 nm to 2,500 nm to be sensed. Preferably, the mark comprises an area of from 0.125 inch to 1.0 inch$^2$. Most preferably, the mark is a rectangle having a length ranging from ½ inch to 1 inch and a width of from ⅛ inch to ½ inch.

The near infrared radiation scannable data images on the print media of this invention comprise patterned layers with sufficient NIRF compound to differentiate small areas of the surface of the print medium such that the location of the boundaries between the patterned layer and surface of the print medium is identified by a detector. Preferably, the detected near infrared radiation is converted to a voltage by the detector, such as a photon detector, and the mark provides a voltage of at least 0.1 volts greater than the surface of the print medium. Preferably, the voltage differential is about 0.2 volts. With the detection of these boundaries, data can be encoded such as in the form of a bar code.

A preferred print medium is thermal paper. Thermal paper typically comprises a base substrate, a base coating, a thermosensitive coating positioned on said base coating, an optional top coating and an optional back coating. The near infrared radiation scannable coating, sense mark or data image containing the U.V. absorbing pigment is typically a layer positioned on the base coating, the thermosensitive coating, the optional top coating, the optional back coating, the base substrate, or a combination of these. Such coatings can contain either titanium dioxide or zinc oxide. Zinc oxide is preferred where this layer is on or adjacent to the thermosensitve layer. Alternatively, the near infrared radiation scannable coating, sense mark or data image containing the U.V. absorbing pigment can be incorporated in the base coating, the thermosensitive coating, the optional top coating, the optional back coating, the base substrate, or a combination thereof. When incorporated within the thermosensitive coating, zinc oxide is preferred.

Where an optional overcoat containing U.V. pigment is used, it can be positioned directly on the near infrared radiation scannable mark or data image layer, the thermosensitive coating, the optional top coating, the optional back coating, the base coating, or a combination thereof. In the alternative, it can be incorporated in the thermosensitive coating (where zinc oxide is used), the optional top coating, the optional back coating, the base coating, or a combination thereof.

In preferred methods, NIRF pigments are used within a coating formulation that is applied to the base substrate and overcoated with the base coating and/or thermosensitive layer of the thermal paper. Where this coating formulation is applied to the back side of the thermal paper, the NIRF coating is overcoated with a protective water-proof coating. Such a protective coating may also be applied to coating formulations deposited on the front side of the thermal paper, either before or after application of the thermosensitive layer.

An alternative embodiment is to incorporate the NIRF compound in the coating formulation for the thermosensitive coating. The coating formulation for the thermosensitive layer with NIRF compounds incorporated therein can be applied to the base sheet with conventional equipment and printing methods.

Print samples which contain a near infrared radiation scannable coating, sense mark or data image can be prepared with formulations containing NIRF compounds using conventional printing/coating equipment and techniques. Examples include those of ink jet printing, thermal transfer printing, electrostatic printing, relief printing, offset printing, flexography, lithography and silkscreening. Ink jet printing or thermal transfer printing are preferred where the NIRF compound is to be applied in the pattern of a scannable data image. Flexographic printing equipment is preferred where a uniform coating of NIRF compound is to be applied on the thermal paper and subsequently masked with an activated thermosensitive layer which absorbs near infrared radiation. Where the coating formulation is applied to a base sheet of a thermal paper, the printing or coating operation/procedure is not limited by temperature. Where the coating formulation is deposited on the thermosensitive coating or a top coating thereon, only methods which do not require the application of high temperatures can be used. Once the coating formulation is applied to the thermosensitive coating or top coating, it is dried at temperatures preferably less than 65° C., most preferably at ambient temperature.

The printing methods of the present invention for preparing printed images with a near infrared fluorescent (NIRF) scannable coating, sense mark or data image comprise conventional printing methods such jet printing methods, flexographic printing methods, thermal transfer printing methods etc. using the printing ink or printing system of this invention. Where the print system of the invention is used, both the ink and coating formulation are applied by conventional methods which may not be the same. The coating formulation may simply be flow coated over the a near infrared fluorescent (NIRF) scannable coating, sense mark or data image.

The methods of this invention employing flexographic inks and flexographic printing systems can be performed in conventional flexographic equipment such as that described in U.S. Pat. No, 5,558,020 and those provided by Wolverine and Mark Andy (Flexopress).

In preferred embodiments of the print media of this invention, the concentration of NIRF compound in the near infrared scannable coating, sense mark or data image is sufficiently high to permit printing over the near infrared scannable coating, sense mark or scannable data image.

Without further elaboration, it is believed that one skilled in the art can, using the preceding description, utilize the present invention to its fullest extent. The entire disclosure of all applications, patents, publications, cited above and below, are herein incorporated by reference.

EXAMPLE 1

Preparation of Inks for Flexographic Printing

Four flexographic printing inks are prepared as follows:

INK A: Clear varnish[1] with different levels of NIRF pigment[2],

INK B : Clear varnish[1],

INK C: 50% Clear varnish[1] and 50% White Ink[3], and

INK D: 50% Clear varnish[1] and 50% White Ink[3] with different levels of NIRF pigment[2].

1) Clear Varnish 254–357 (Styrene-Acrylic Based, 37% solid) supplied by Sun Chemical
2) Silicon-based NIRF 2300 Resin (2400 ppm) provided by Eastman Chemical.
The amount of NIRF pigment is specified in Table 1.
3) White Ink 14113–59401 (60% solid, mostly TiO2) supplied by Sun Chemical

Sample Preparation

The following samples are prepared on paper stock using a hand-drawdown/hot air drying process and 200P or 400Q anilox rolls.

SET 1. Print Ink A on paper substrate with 200p or 400Q anilox rolls.

SET 2. Print Ink A on paper substrate with 200p or 400Q anilox rolls.

Print Ink B on top of Ink A.

SET 3. Print Ink A on paper substrate with 200p or 400Q anilox rolls.

Print Ink B on top of Ink A.

Print Ink C on top of Ink B.

SET 4. Print Ink D on paper substrate with 200p anilox roll.

5) 200p anilox roll applies about 0.0043 lbs/ream.
6) 400Q anilox roll applies about 0.0032 lbs/ream.

Test Conditions

Samples are placed in an Atlas HP UV system to determine light-fastness, (10 hr in HP UV system=1 month in office lighting conditions). The NIRF strength of samples is measured before and during the test period using a NIRF 780 detector (Model DM-8, manufactured by V.L. Engineering) at a normal sensitivity setting. The results are shown below in Table 1.

TABLE I

| Sample NIRF % | Exposure Time (hours) in Atlas HP UV ||||||||||
|---|---|---|---|---|---|---|---|---|---|
| | 0 | 2 | 5 | 10 | 20 | 46 | 72 | 94 | 122 | 165 |
| Set 1 | | | | | | | | | | |
| 10% 200P | 1508 | 1505 | 1502 | 792 | 180 | 4 | | | | |
| 5% 200P | 1506 | 1500 | 782 | 250 | 32 | 4 | | | | |
| 2.5% 200P | 1502 | 775 | 352 | 80 | 4 | | | | | |
| 1.25% 200P | 868 | 369 | 136 | 14 | | | | | | |
| 0.62% 200P | 413 | 123 | 22 | 3 | | | | | | |
| 0.31% 200P | 184 | 49 | 12 | | | | | | | |
| 5% 400Q | 1505 | 1192 | 547 | 126 | 3 | | | | | |
| 1.25% 400Q | 610 | 215 | 66 | 7 | | | | | | |
| 0.31% 400Q | 74 | 19 | 4 | | | | | | | |
| Set 2 | | | | | | | | | | |
| 5% 200Q | 1506 | 1501 | 893 | 307 | 44 | 5 | | | | |
| 2.5% 200P | 1492 | 746 | 362 | 92 | 8 | 3 | | | | |
| 1.25% 200P | 935 | 409 | 182 | 34 | 4 | | | | | |
| 0.62% 200P | 468 | 176 | 55 | 4 | | | | | | |
| 0.31% 200P | 180 | 47 | 6 | | | | | | | |
| 1.25% 200P | 552 | 240 | 88 | 13 | | | | | | |
| Set 3 | | | | | | | | | | |

TABLE I-continued

| Sample | Exposure Time (hours) in Atlas HP UV | | | | | | | | | |
|---|---|---|---|---|---|---|---|---|---|---|
| NIRF % | 0 | 2 | 5 | 10 | 20 | 46 | 72 | 94 | 122 | 165 |
| 5% 200P | 1507 | 1507 | 1506 | 1508 | 1501 | 1042 | 566 | 309 | 165 | 79 |
| 2.5% 200P | 1504 | 1502 | 1395 | 1215 | 778 | 348 | 128 | 79 | 32 | 17 |
| 1.25% 200P | 951 | 902 | 794 | 615 | 369 | 124 | 43 | 17 | | |
| 0.62% 200P | 425 | 383 | 318 | 245 | 139 | 34 | 13 | | | |
| 0.31% 200P | 228 | 196 | 168 | 125 | 76 | 22 | 5 | | | |
| 1.25% 400Q | 628 | 587 | 512 | 402 | 250 | 88 | 31 | 15 | | |
| Set 4 | | | | | | | | | | |
| 4% 200P | 1505 | 1505 | 1502 | 1318 | 850 | 371 | 210 | 127 | 71 | 32 |
| 2% 200P | 1324 | 1111 | 900 | 656 | 389 | 152 | 70 | 40 | 20 | 9 |
| 1% 200P | 674 | 642 | 533 | 395 | 225 | 85 | 39 | 20 | 12 | |
| 0.5% 200P | 319 | 262 | 203 | 138 | 71 | 22 | 10 | | | |
| 0.25% 200P | 158 | 134 | 104 | 70 | 36 | 12 | | | | |
| Base Paper | 3 | 3 | 3 | 3 | 3 | 3 | 3 | 3 | 3 | 3 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A printing ink comprising at least one resinous binder, at least one near infrared fluorescent (NIRF) compound, a U.V. absorbing pigment or compound, and optionally a solvent or aqueous based solvent
   wherein said NIRF compound emits radiation at wavelengths in the range of 650 nm to 2,500 nm and the amount of NIRF compound is sufficient to form coatings, marks and images which can be sensed by a photon detector operating in the near infrared region of 650 nm to 2,500 nm, and
   said U.V. absorbing pigment or compound does not reduce the emission of radiation at wavelengths in the range of from 650 nm to 2,500 nm by the coatings, marks and images formed containing said NIRF compound.

2. In a printing method for preparing printed images with a near infrared fluorescent (NIRF) scannable coating, sense mark or data image, the improvement comprising printing with an ink of claim 1.

3. A thermal transfer ribbon comprising a substrate and a thermal transfer layer positioned thereon which comprises an ink of claim 1.

4. A printing ink comprising at least one resinous binder, at least one near infrared fluorescent (NIRF) compound, a U.V. absorbing pigment, and optionally a solvent or aqueous based solvent
   wherein said NIRF compound emits radiation at wavelengths in the range of 650 nm to 2,500 nm and the amount of NIRF compound is sufficient to form coatings, marks and images which can be sensed by a photon detector operating in the near infrared region of 650 nm to 2,500 nm and
   said U.V. absorbing pigment is selected from the group consisting of titanium dioxide, zinc oxide and combinations thereof in an amount sufficient to form coatings, marks and images containing NIRF compounds with enhanced light-fastness.

5. A printing ink as in claim 4 which contains an amount of titanium dioxide U.V. absorbing pigment sufficient to improve, by more than 300%, the light-fastness of the coatings, marks and images formed containing said NIRF compounds.

6. A printing ink as in claim 5, wherein the amount of NIRF compound ranges from 1 ppm to 1000 ppm, based on the total dry components of the printing ink and the amount of titanium dioxide ranges from 5–50 wt %, based on the total dry components of the printing ink.

7. A printing ink as in claim 4, which additionally contains a colorant selected from cyan dyes, cyan pigments, magenta dyes, magenta pigments, black dyes, yellow dyes and yellow pigments which do not reduce the emission of radiation at wavelengths in the range of from 650 nm to 2,500 nm by the coatings, marks and images formed containing said NIRF compounds.

8. A printing ink as in claim 4, wherein said NIRF compounds are incorporated within a solid pigment particle comprised of a polymer resin and are shielded from ambient air.

9. A printing ink as in claim 4 which forms coatings, marks and images containing NIRF compounds sufficiently stable in air and exposure to indoor U.V. light so as to be sensed by a detector over 6 months after said NIRF compounds are applied to a substrate.

10. A thermal transfer ribbon comprising a substrate and a thermal transfer layer positioned thereon which comprises an ink of claim 4.

11. A printing system which comprises:
   a) a printing ink comprising at least one solvent or aqueous based solvent, at least one resinous binder and at least one near infrared fluorescent (NIRF) compound, wherein said NIRF compound emits radiation at wavelengths in the range of 650 nm to 2,500 nm and the amount of NIRF compound is sufficient to form coatings, marks and images which can be sensed by a photon detector operating in the near infrared region of 650 nm to 2,500 nm, and
   b) a coating formulation comprising a U.V. absorbing pigment selected from the group consisting of titanium dioxide, zinc oxide and combinations thereof in an amount sufficient to form an overcoat on coatings, marks and images containing NIRF compounds which enhances the light-fastness of said NIRF compounds.

12. A printing system as in claim 11 wherein said printing ink, coating composition or both additionally contain a colorant selected from cyan dyes, cyan pigments, magenta dyes, magenta pigments, black dyes, yellow dyes and yellow pigments which do not reduce the emission of radiation at wavelengths in the range of from 650 nm to 2,500 nm by the coatings, marks and images formed from by said printing ink.

13. A printing system as in claim 11, wherein said coating formulation additionally contains at least one NIRF compound.

14. In a printing method for preparing printed images with a near infrared fluorescent (NIRF) scannable coating, sense mark or data image, the improvement comprising printing with a print system of claim 11 wherein a coating, sense mark or data image is printed with printing ink a) and is overcoated with a layer of coating formulation b).

15. A print medium with at least one near infrared radiation scannable coating, sense mark or data image positioned thereon, wherein said near infrared radiation scannable coating, sense mark or data image comprises at least one near infrared-fluorescent (NIRF) compound which emits near infrared radiation at a wavelength in the range of from 650 nm to 2,500 nm and a polymer binder resin which limits contact of the NIRF compound with air and wherein:
 a) the near infrared radiation scannable coating, sense mark or data image additionally comprises a U.V. absorbing pigment or compound,
 b) the near infrared radiation scannable coating, sense mark or data image is overcoated with a layer which comprises a U.V. absorbing pigment or compound, or
 c) a combination of both a) and b);
wherein the U.V. absorbing pigment or compound does not reduce the emission of radiation at a wavelength in the range of from 650 nm to 2,500 nm by said near infrared radiation scannable coating, sense mark or data image.

16. A print medium with at least one near infrared radiation scannable coating, sense mark or data image positioned thereon, wherein said near infrared radiation scannable coating, sense mark or data image comprises at least one near infrared-fluorescent (NIRF) compound which emits near infrared radiation at a wavelength in the range of from 650 nm to 2,500 nm and a polymer resin which limits contact of the NIRF compound with air and wherein:
 a) the near infrared radiation scannable coating, sense mark or data image additionally comprises a U.V. absorbing pigment selected from the group consisting of titanium dioxide, zinc oxide and combinations thereof,
 b) the near infrared radiation scannable coating, sense mark or data image is overcoated with a layer which comprises a U.V. absorbing pigment selected from the group consisting of titanium dioxide, zinc oxide and combinations thereof, or
 c) a combination of both a) and b).

17. A print medium as in claim 16, wherein said near infrared radiation scannable coating, sense mark or data image comprises a scannable layer positioned on said print medium and the concentration of the NIRF compounds in the scannable layer ranges from 0.5 ppm to 1000 ppm, based on total solids within said scannable layer and the concentration of titanium dioxide or zinc oxide in said scannable layer or overcoat layer ranges from 5 to 50 wt %, based on total solids within said scannable layer or overcoat layer.

18. A print medium as in claim 17, which is thermal paper having a base substrate, a base coating, a thermosensitive coating positioned on said base coating, an optional top coating and an optional back coating, wherein the scannable layer which is the near infrared radiation scannable coating, sense mark or data image is positioned on or incorporated in:
 a) said base coating,
 b) said thermosensitive coating,
 c) said optional top coating,
 d) said optional back coating,
 e) said base substrate, or
 f) a combination of a), b), c), d) and e);
and the optional overcoat is positioned directly on or incorporated in:
 a) said the near infrared radiation scannable mark or data image layer,
 b) said thermosensitive coating,
 c) said optional top coating,
 d) said optional back coating,
 e) said base coating ; or
 f) a combination of a), b), c), d) and e).

19. A print medium as in claim 17, wherein the concentration of NIRF compound in the scannable layer which is the near infrared scannable coating, sense mark or data image is sufficiently high to permit printing over the near infrared scannable coating, sense mark or scannable data image.

20. A print medium as in claim 16, wherein the NIRF compound is sufficiently stable in air and ambient indoor light so as to be sensed by a detector over six months after the near infrared radiation scannable coating, sense mark or data image is positioned on the print medium.

21. A print medium as in claim 16, which contains either
 a) a near infrared radiation scannable coating which covers the entire surface of said print medium,
 b) a near infrared radiation scannable data image in the form of a bar code or
 c) a near infrared radiation scannable sense mark positioned on the surface of said print medium of sufficient size to trigger an automatic operation when scanned and identified by a logic element.

22. A print medium as in claim 16, wherein the NIRF compound is incorporated within a solid pigment particle comprised of a polymer resin and is shielded from ambient air.

23. A thermal transfer ribbon comprising a substrate and a thermal transfer layer positioned thereon which comprises at least one wax, at least one thermoplastic resin and at least one near infrared radiation scannable pigment which comprises at least one near infrared fluorescent (NIRF) compound which emits near infrared radiation at a wavelength in the range of from 650 nm to 2,500 nm and a polymer binder resin which limits contact of the NIRF compound with air and wherein either
 a) said thermal transfer layer additionally comprises at least one U.V. absorbing pigment or compound,
 b) said thermal transfer layer is overcoated with a secondary layer which comprises at least one U.V. absorbing pigment or compound, or
 c) both said thermal transfer layer and said secondary layer contain at least one U.V. absorbing pigment or compound.

24. A thermal transfer ribbon as in claim 23 wherein said thermal transfer layer, said secondary layer or both contain at least one U.V. absorbing pigment selected from the group consisting of titanium dioxide, zinc oxide and combinations thereof.

* * * * *